UNITED STATES PATENT OFFICE.

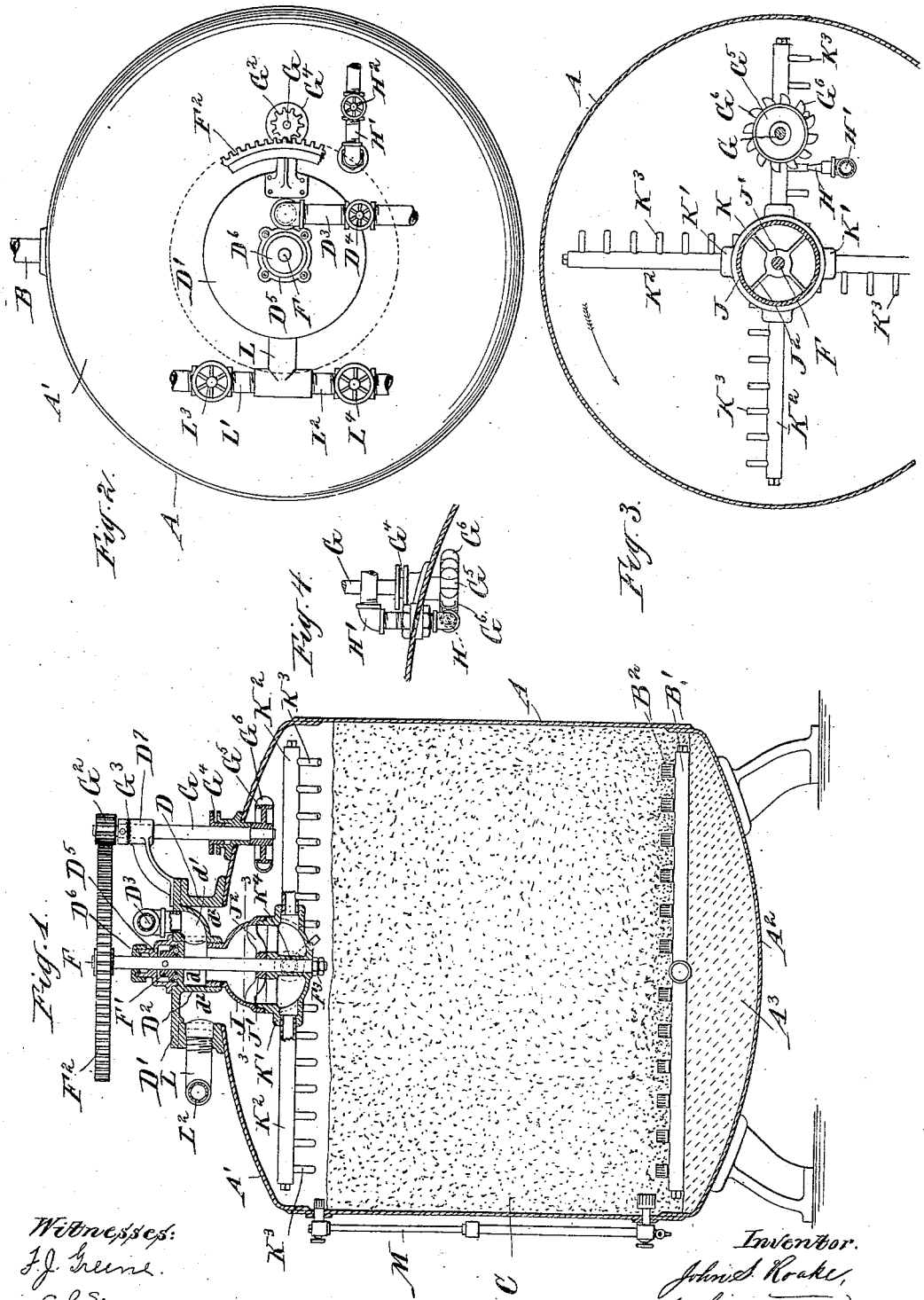

JOHN S. ROAKE, OF NEW YORK, N. Y.

FILTER.

943,708.  Specification of Letters Patent.  Patented Dec. 21, 1909.

Application filed February 17, 1909. Serial No. 478,368.

*To all whom it may concern:*

Be it known that I, JOHN S. ROAKE, a citizen of the United States, residing in the city of New York, borough of Brooklyn, in the county of Kings and State of New York, have invented a certain new and useful Improvement in Filters, of which the following is a specification.

The invention relates to apparatus for filtering liquids, and more especially to means for agitating and cleansing the filtering material when fouled from use.

The invention is designed for service in treating water in comparatively large volumes as required in various manufacturing and other operations, and the object of the invention is to provide easily operated, efficient, and economical means for agitating the filtering material, loosening by attrition the accumulation of undesirable material thereon and removing it while suspended in the cleansing water. The agitation is effected by the action of strong moving jets of water directed against the upper surface of the filtering material, the motion being induced preferably by a water motor within the filter-case.

The invention consists in certain novel features of construction and arrangement by which the above objects are attained, to be hereinafter described.

The accompanying drawings form a part of this specification and show an approved form of the invention.

Figure 1 is a vertical central section of a filter equipped in accordance with the invention. Fig. 2 is a corresponding plan view with certain portions broken away to show the parts beneath. Fig. 3 is a horizontal section partly in plan view, the plane of section being indicated by the line 3—3 in Fig. 1. Fig. 4 is a vertical section, partly in elevation, showing certain portions alone.

Similar letters of reference indicate the same parts in all the figures.

A is a vertical cylindrical tank suitably supported, having heads $A^1$ $A^2$, containing at the bottom a layer of cement $A^3$ on which rests a tubular grating or system of pipes and branches $B^1$ carrying filter-nozzles $B^2$ and communicating through the wall of the tank by a pipe B through which the filtered water is carried away. Above the grating $B^1$ is the bed of filtering material C reaching nearly to the top and composed of layers of sand, gravel and other material adapted for the purpose. All these parts of the apparatus may be understood to be of the usual or any approved types.

D is a cylindrical casting supported on the upper head $A^1$ and surrounding a central opening in the latter, provided with a cover $D^1$ having a cylindrical depending flange $D^2$ forming a chamber $d$ from which extends an upwardly curved passage $d^1$ terminating at the upper surface of the cover and receiving a pipe $D^3$ controlled by a valve $D^4$ through which water is supplied to the chamber $d$.

On the upper face of the cover is a casing $D^5$ surmounted by a stuffing-box $D^6$ through which extends a vertical shaft F supported by a collar $F^1$ forming with the top of the cover, within the casing $D^5$, a ball-bearing or other antifriction support for the shaft and the attachments suspended from its lower end. At the upper end of the shaft is a gear-wheel $F^2$ in mesh with a pinion $G^2$ on a vertical motor-shaft G suspended by a ball-bearing $G^3$ in a bracket $D^7$ on the cover $D^1$. The motor-shaft extends downward through a stuffing-box $G^4$ in the head $A^1$ and carries at the lower end a horizontal wheel $G^5$ provided with peripheral buckets $G^6$ adapted to be rotated by a jet of water projected against the buckets from a nozzle H on a pipe $H^1$ extending through the head $A^1$ and controlled by a valve $H^2$.

Secured to the flange $D^2$ is a semispherical casing J having a central boss $J^1$ serving as a guide for the main-shaft F and joined to the casing by arms or webs $J^2$ permitting free communication with the chamber $d$ above. Below the casing J is a hollow casting or shell K secured to the main-shaft F to revolve therewith and flanged to match to a corresponding flange on the lower edge of the casing J to make a close joint therewith but free to revolve relatively thereto. The shell K is closed at the bottom and has four or other number of radial bosses $K^1$ in each of which is secured a hollow arm or pipe $K^2$ equipped on the under side with a series of inclined jet-nozzles $K^3$ extending nearly to the upper surface of the filtering material C. The shaft F extends through an interior boss or sleeve $K^4$, and the bottom of the shell K, and the latter is held thereto by a nut and jam-nut $F^3$.

From one side of the casing D extends a pipe L having two branches $L^1$ $L^2$ controlled by valves $L^3$ $L^4$ and serving respectively to supply water to be filtered and to carry away vitiated cleansing water in the cleaning operation.

When the filter is performing its function the valves $L^4$ $D^4$ and $H^2$ are closed and water is admitted by the valve $L^3$ through the pipe L into the annular space $d^2$ in the casing D, percolates through the layers of filtering material, depositing therein any matter held in suspension, and is led away freed from impurities through the filter nozzles $B^2$, branches $B^1$ and pipe B to be used as required. The greater part of the matter eliminated by the filtering process collects at or near the surface of the filtering material, gradually lessening quantities extending downward a short distance therein, and therefore by loosening the sand or gravel at and near the surface in the process of cleansing, the larger part of the objectionable material may be freed and flushed out by a reversal of the current through the filter.

The cleansing operation is performed preferably as follows:—The supply of water is shut off by closing the valve $L^3$ and the water line in the filter permitted to fall some distance below the surface of the filtering material as may be determined by observing the height of the water column in the glass gage M, the escape is then cut off by closing a valve, not shown, in the pipe B; the valve $D^4$ in the pipe $D^3$ is then opened permitting water under pressure to flow to the chamber $d$, through the shell K and pipes $K^2$, escaping in strong jets from the nozzles $K^3$ against the surface of the filtering material, the valve $H^2$ in the pipe $H^1$ is also opened and the strong stream thus directed against the buckets $G^6$ of the wheel $G^5$ rotates the pinion $G^2$ and gear-wheel $F^2$ and correspondingly revolves the shell K and its jets, presenting the latter to the surface in circular paths. This action stirs up the sand to a depth depending on the force of the jets and their inclination, and loosens the collected matter, causes the particles of sand or gravel mingled with water to grind against each other and thus by attrition cleans the particles. The valve $L^4$ is then opened, and a reverse current admitted through the pipe B and filter-nozzles $B^2$, preferably of previously filtered water, which carries over the loosened matter still agitated by the revolving jets $K^3$ and it is led away through the pipe $L^2$. When thus washed sufficiently the supply to the jets $K^3$ and to the motor is stopped and the upward current through the filter continued until by inspection or otherwise the escaping water is found to be clear; the supply through the pipe B is then stopped, the valve $L^4$ closed, and the cleansed filter conditioned to perform its filtering operation on water admitted through the valve $L^3$ as before.

By inclining the jet-nozzles rearwardly to the direction of revolution, as shown, the reaction of the escaping water aids the rotation and such construction is therefore considered preferable, but the angle of inclination may be varied or the jets arranged vertically to increase the depth of agitation.

The jets may be arranged at such radial points relatively to each other as to avoid tracking and cause each to describe its own independent circle.

Other forms of water-driven motors may be employed, or other means substituted for producing the rotatory motion. The device shown is preferred for the reasons that it is inclosed within the casing and the escaping water utilized in the washing process, and is simple in construction and operation.

I claim:—

1. In a filter, a closed tank, a filter bed therein, a cement bed beneath the filter bed, a system of pipes supported upon said cement bed, a discharge pipe communicating with said system of pipes, a rotary shell above the filter bed provided with lateral pipes and discharge nozzles, means for admitting water to the tank outside the shell, means for admitting water under pressure to said shell, a rotary motor, means for projecting water against the buckets of said motor connections between the same and said shell whereby the latter is rotated, and a semi-spherical casing having a support for the shaft of said shell and with which casing said shell forms a close joint yet allowing it to revolve.

2. In a filter, a closed tank, a cover therefor having a depending flange, a semi-spherical casing supported from said flange, a shaft extending through said flange and casing, a shell mounted upon the shaft below the casing and forming a tight joint therewith, radial pipes carried by the shell and having jet nozzles, a gear wheel on the shaft outside of the tank, a shaft parallel with the first-mentioned shaft, a jet motor on said shaft, and disposed within said tank, a pipe for projecting water against the buckets of said motor, and a gear on said shaft meshing with the shaft of the shell.

3. In a filter, a closed tank, a cover therefor having a depending flange, a semi-spherical casing supported from said flange, a shaft extending through said flange and casing, a shell mounted upon the shaft below the casing and forming a tight joint therewith, radial pipes carried by the shell and having jet nozzles, a gear wheel on the shaft outside of the tank, a shaft parallel with the first-mentioned shaft, a jet motor on said shaft and disposed within said tank, a pipe for projecting water against the buckets of said motor, a gear on said shaft meshing with the shaft of the shell, means for admitting water under pressure to the tank outside of said shell and casing, and independent means for admitting water under pressure to the interior of the shell.

4. In a filter, a closed tank, a vertical main-shaft therein extending to the exterior of said tank, a shell attached to said main-shaft to rotate therewith within said tank, radial pipes from said shell, jet-nozzles on said pipes, a gear-wheel on said main-shaft exterior to said tank, a bucket-wheel in said tank, a nozzle arranged to throw a stream of water on said bucket-wheel to rotate it, a motor-shaft from said bucket-wheel extending to the exterior of said tank, a pinion on said motor-shaft in mesh with said gear-wheel, and means for supplying water under pressure to said shell.

5. In a filter, a tank, a cover therefor, a fixed chamber on said cover within said tank, a main-shaft in said chamber extending to the exterior of said tank, a revolving shell below said fixed chamber, an inlet passage leading from the exterior of said cover to said fixed chamber, radial pipes on said shell, jet-nozzles on said pipes, a gear-wheel on said main-shaft exterior to said cover, a bucket-wheel in said tank, a nozzle arranged to throw a stream of water on said bucket-wheel to rotate it, a motor-shaft from said bucket-wheel extending to the exterior of said tank, a pinion on said motor-shaft in mesh with said gear-wheel, and means for supplying water under pressure to said passage and to said nozzles.

6. In a filter, a closed tank, a cover therefor having a depending flange forming a chamber with an upwardly curved passage, a valve controlled pipe connected with said passage, a semi-spherical casing depending from said flange and having a central boss, a hollow shell forming with said casing a close joint, the shell being relatively rotatable, and having lateral passages, radial pipes leading from said passages and having jet nozzles, a shaft extending through said shell, casing, and cover, and means outside of the tank for rotating said shaft.

In testimony that I claim the invention above set forth I affix my signature, in presence of two witnesses.

JOHN S. ROAKE.

Witnesses:
CHARLES R. SEARLE,
FLORENCE J. GREENE.